Oct. 1, 1929.         H. M. CHANCE         1,730,123
METHOD AND APPARATUS FOR SEPARATING MATERIALS
OF DIFFERENT SPECIFIC GRAVITIES
Filed Dec. 5, 1925
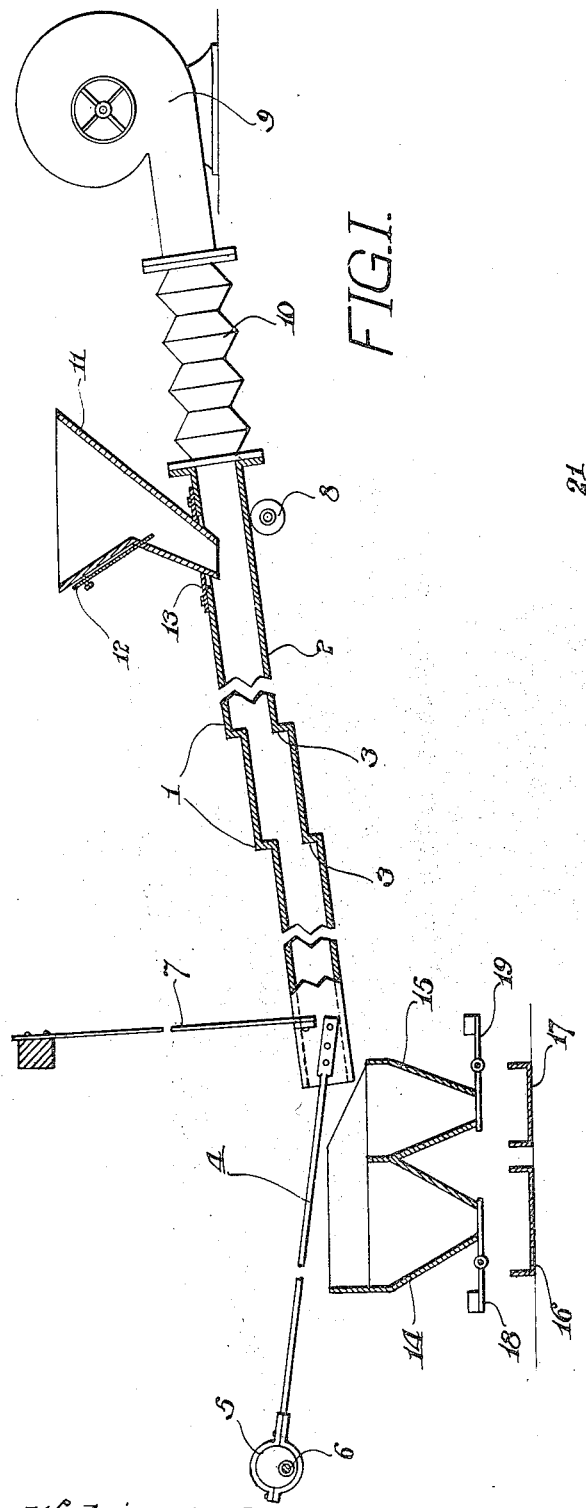
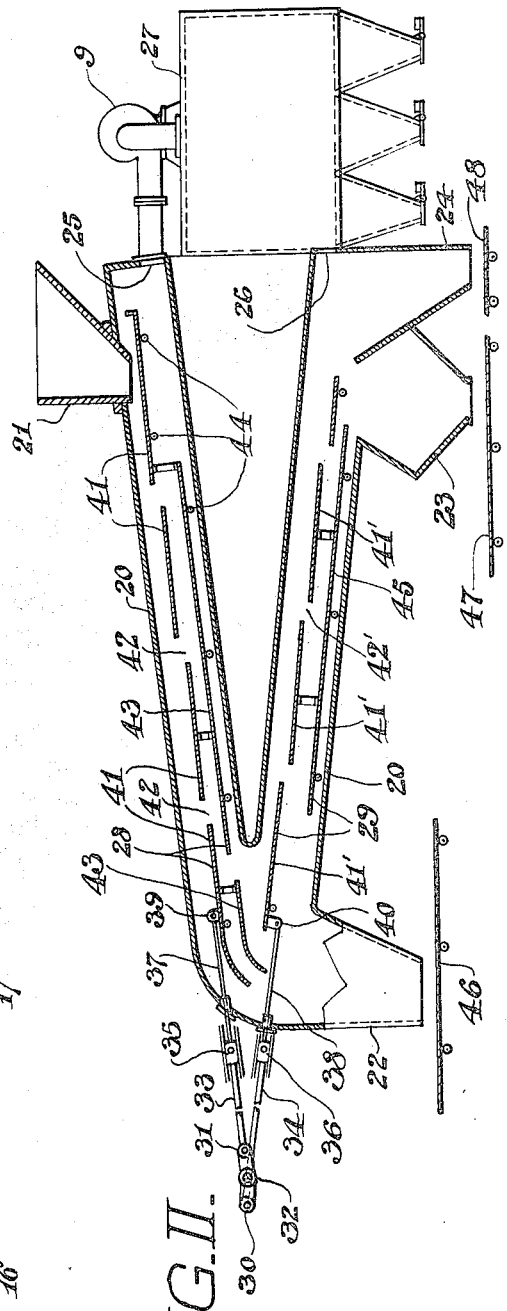
Witnesses:
Carl K. Schulze
Frank H. Mills.
Inventor
Henry M. Chance

UNITED STATES PATENT OFFICE

HENRY M. CHANCE, OF PHILADELPHIA, PENNSYLVANIA

METHOD AND APPARATUS FOR SEPARATING MATERIALS OF DIFFERENT SPECIFIC GRAVITIES

Application filed December 5, 1925. Serial No. 73,420.

My invention consists of a pneumatic method and apparatus for separating materials of different physical characters, being applicable to the concentration of ores, separation of coal from refuse, and the like. In carrying out my method the materials to be separated are subjected to agitation whereby the materials tend to stratify according to their relative weights and specific gravities and simultaneously are caused to move over the surface upon which they rest at any desired predetermined velocity, the upper layers being subjected to a blast of air, (or other gaseous medium,) moving at high velocity whereby particles comprising the said upper stratum are caused to roll, slide or move over the subjacent layers. The surface over which said lower layers are moving may be provided with openings through which the slow moving particles in contact with said surface can readily drop, but across which the particles of the upper layers, moving at much higher velocity, readily pass to continue their travel upon a similar surface, or to be directly discharged as one of the separated products.

The surface over which the materials are moved may be the surface of a table, either with or without riffles, the floor of a trough or the like; the materials may be agitated by imparting a shaking or bumping movement to the said surface, and/or by causing air to flow upwardly through said materials or other convenient means for effecting agitation. By inclining the surface, or by shaking or bumping, the materials may readily be caused to move at the desired rate of travel and in the desired direction. If agitation be effected by air the floor of the trough or surface of the table will be perforate and supplied with air under pressure to provide upwardly rising air as in air-jigs, air concentrating tables and the like. If the method be carried out in a trough, openings of adjustable width may be provided at intervals, and a second trough attached below the separating trough, into which materials falling through said openings will drop and along which they are transported in like manner to those in the upper trough.

To complete such apparatus this double trough structure is provided with means for producing a shaking or bumping movement and is enclosed in a box or envelope through which a strong blast of air is passed by suction and/or pressure induced by a fan, or other suitable appliance for imparting motion to air. If desired the openings in the floor of the separating trough can be eliminated, the materials discharging in the described manner from the end of the separating trough, in which case the carrier trough below the separating trough can also be eliminated.

From the foregoing description it will be understood that the method consists in translating or in assisting in translating the lighter materials, by flowing with a current of air at a relatively high velocity, towards a region of discharge for said lighter materials, and in separately translating the heavier materials toward a region of discharge for said heavier materials, thus effecting separation by translating said materials to different regions of discharge, the lighter materials being blown out of, or away from, the heavier materials by a current of air that translates or assists in translating said lighter material to the desired region of discharge.

Apparatus of different types by which my invention may be carried out are shown by the drawings, in which Fig. I is a vertical cross-section and elevation of a simple form in which the separator consists of an inclined shaking trough or table, Fig. II is a similar cross-section and elevation of a stationary box or envelop in which are mounted separating shaking surfaces, with the air operating current in closed circuit, with dust settling chamber, and provision for retreating.

In Fig. I the separating structure is a box or closed trough 1 with separating floor or table 2 which may or may not be provided with steps or riffles illustrated by 3, 3, provided with means for imparting a shaking or bumping movement shown diagrammatically by the flexible connecting rod 4, eccentric sleeve 5 and drive shaft 6. This structure is supported by flexible hanger arms 7 and bearing rollers 8 and is connected by flexible duct 10, shown as of bellows type, with a blower to supply air under pressure, shown as a fan 9. A stationary feed hopper 11, provided with adjustable feed gate 12 and sliding sealing flange 13, provides for the introduction of materials to be separated, and bins for receiving the lighter and heavier of the separated products are shown respectively by 14 and 15 closed with counterweighted doors 18, 19 and conveyors 16 and 17 for removing said products.

In this apparatus the shaking motion of the floor 2 causes the materials to stratify and to move toward the bin 15, while the blast of air from 9 blows the lighter materials at high velocity across the partition separating 14 and 15 into the bin 14, the heavier materials dropping into the bin 15. Falling of the heavier material down over steps or riffles 3, 3, produces rearrangement of the stratified heavier materials and permits lighter material enmeshed thereby or therein to rise to the top of said heavier materials where it comes within the influence of the rapidly moving current of air. The steps or riffles 3, 3, present no obstacle to the flow of materials over the separating floor 2, but tend to accelerate the rate of flow by permitting the materials to fall by gravity from a higher to a lower level, the separating floors 2, 41, 43, etc. all being shown as flat unobstructed surfaces. These steps or riffles 3 during the forward oscillation of the separating surfaces 2 transmit energy from the connecting rod 4 directly to the materials, thus imparting to these materials the maximum velocity of movement, so that the momentum thus acquired tends to keep the materials moving longitudinally during the reverse reciprocation of the surface 2, each of such steps acting like the well-known oscillating trough or pan feeders which are closed at the back but open at the front and into which the materials are fed.

In Fig. II the apparatus is completely enclosed by the stationary enveloping structure 20, provided with a feed hopper 21, a bin for lighter materials, a bin for heavier materials 23, and a bin 24 for mixed materials and/or materials of intermediate weight, such as bony or laminated coal, when treating coal, or slate with intermixed coal, or middlings when treating ores. By keeping these bins and hopper 21 partly filled, the structure is air sealed. Provision for the circulation of air by means of a blower, shown as a fan 9, is provided by the aperture 25 connected to the discharge from the fan 9, and the opening 26 communicating with the dust collecting chamber 27, with which the intake of the fan 9 is connected.

Within this structure there are installed two shaking elements 28 and 29 to which motion is imparted by the cranks 30 and 31 both operated by the drive shaft 32 by means of connecting rods 33, 34, cross-heads 35, 36, and rods 37, 38, which are attached to the shaking elements 28, 29, through stuffing boxes 39, 40.

The shaking element 28 consists of a single structure the parts of which are rigidly connected together and include a number of plates or transporting surfaces 41, 41, constituting the floor of a trough or other suitable pan separated by open gaps or apertures 42, and a similar transporting pan floor 43, 43, below 41, 41, for the transportation and retreatment of materials dropping through the apertures 42, 42. This structure 28 is mounted by any means that will permit of free reciprocating movement, illustrated in the drawing by the rollers 44, 44.

The second shaking element 29 is of similar construction to element 28 consisting of similar surfaces 41', 41', with air gaps and conveying pan 45.

Describing the operation of this apparatus in removing slate and bony coal from coal, the coal is fed upon the shaking floor 41, is stratified by the shaking motion with the coal working up to the top of the mass, the whole mass moving down over the floor 41 at any desired rate of travel depending upon the amplitude of the oscillations and the inclination of the surface, the coal is rapidly blown away from the moving mass and falls into the hopper 22, while the slate and bony coal drops through the gaps 42 upon the shaking surface 43, together with coal that may be entrained with the slate and bony coal. As this mixture moves down over the surface 43, coal rising to its upper portion is blown rapidly away from the moving mass and falls into hopper 22, while the slate and bony coal drops through the aperture in 43 and falls upon the shaking surface 41', down and along which it is transported, the slate falling through the apertures 42' into the conveying pan 45 to be discharged into hopper 23, while the bony coal is blown by the air current across the apertures 42' and is delivered into middlings hopper 24, for crushing or other retreatment. Means for removing the separated materials from hoppers 22, 23 and 24 are diagrammatically illustrated by 46, 47, and 48 shown as belt conveyors.

The application of the method and use of the apparatus in the concentration of ores or the separation of other materials will be understood without further description.

Agitation by shaking of dry materials does not produce complete stratification according to the specific gravities of the individual particles. Depending upon the character of the agitation there will be a tendency for the heavier and larger particles to sink and the lighter and smaller particles to accumulate at the top, or, a tendency of the coarser particles to rise to and rest at or upon the surface of the finer particles, the top layer often containing coarse particles of both high and low specific gravity. This is utilized in dry panning gold gravel, by bringing the coarse gravel to the top, skimming off the coarse pebbles and repeating until nothing but sand and fine particles of gold mixed with magnetic sand, and other heavy minerals, remain in the pan.

In the method herein disclosed in its application to coal, advantage is taken of this tendency of the large particles of coal and slate also to accumulate at the top or ride upon the top of the shaking mass, the air current being adjusted as to velocity to blow and transport the coal at high velocity without moving the heavier slate and other impurities, or if such movement occurs, at much greater velocity than slate or rock can be moved by this air current.

Having described my invention, I claim:

1. The method of separating materials of different specific gravities and different physical character which consists in agitating a mass of said materials by so imparting longitudinal reciprocating motion to said mass of materials that a positive longitudinal motion of translation in a predetermined direction is produced in said mass, moving said mass in said longitudinal predetermined direction at a predetermined velocity, in a path unobstructed to movement in said direction, but obstructed to movement in a direction opposed to said predetermined direction of travel, in causing said agitation to produce stratification in said materials whereby the heavier of said materials and small particles of lighter materials segregate in the lower part of said mass, and the lighter and larger particles of said materials rise to form the upper surface of said mass, and in causing a gaseous fluid medium to move at a relatively high velocity over and in contact with substantially only the upper surface of the longitudinally moving mass of materials in a direction coincident with the longitudinal path of travel.

2. Apparatus for separating materials of different specific gravities and different physical character, comprising in combination a longitudinally inclined conduit closed at bottom, top and sides, means for imparting longitudinal reciprocating motion to said conduit, the floor of said conduit being broken into a plurality of surfaces by steps presenting substantially upright surfaces adapted to restrain the movement of particles moving over said floor in one direction, while presenting no obstruction to the movement of materials passing over said floor in the opposite direction; means adjacent to the inlet end of said conduit for feeding materials into said conduit; means for supplying a gaseous fluid medium under pressure to said inlet end of said conduit above the bottom thereof adjacent to said feeding means, the top of said closed conduit being stepped, said stepped top being parallel to said stepped floor, the reciprocating motion of said conduit inducing a motion of translation in said materials away from said feeding means, at a rate of travel predetermined by the amplitude, number and character of the reciprocations of said conduit, and said fluid medium under pressure being restrained by said walls and top of said conduit to flow in a direction parallel to that of said moving materials, and moving in contact with substantially only the upper surface of said materials at a velocity materially greater than said predetermined velocity of travel of said materials, receiving means at the discharge end of the conduit for receiving the heavier materials and receiving means beyond said first mentioned receiving means for receiving the lighter materials carried thereto by said elastic fluid medium moving at a high velocity.

In witness whereof I have hereto appended my signature this 3rd day of December, 1925.

HENRY M. CHANCE.